United States Patent
Matsen et al.

(10) Patent No.: US 10,743,377 B2
(45) Date of Patent: Aug. 11, 2020

(54) INDUCTION HEATING CELLS COMPRISING TENSIONING MEMBERS WITH NON-MAGNETIC METAL CORES

(71) Applicant: The Boeing Company, Chicago, IL (US)

(72) Inventors: Marc R. Matsen, Seattle, WA (US); William C. Dykstra, Rockford, MI (US); Gregory A. Foltz, San Diego, CA (US); Lee C. Firth, Renton, WA (US)

(73) Assignee: The Boeing Company, Chicago, IL (US)

( * ) Notice: Subject to any disclaimer, the term of this patent is extended or adjusted under 35 U.S.C. 154(b) by 350 days.

(21) Appl. No.: 15/841,835

(22) Filed: Dec. 14, 2017

(65) Prior Publication Data

US 2019/0191497 A1 Jun. 20, 2019

(51) Int. Cl.
*H05B 6/02* (2006.01)
*H05B 6/10* (2006.01)
(Continued)

(52) U.S. Cl.
CPC .......... *H05B 6/104* (2013.01); *H05B 6/105* (2013.01); *B29C 33/06* (2013.01); *B29C 2035/0811* (2013.01)

(58) Field of Classification Search
CPC ... H05B 6/02; H05B 6/14; H05B 6/36; H05B 6/10; H05B 6/104; H05B 6/105;
(Continued)

(56) References Cited

U.S. PATENT DOCUMENTS 4,777,466 A * 10/1988 Bordalen ............... H01F 30/16
                                                        336/180
5,202,542 A *  4/1993 Ferguson ............... G01N 3/04
                                                        219/50
(Continued)

FOREIGN PATENT DOCUMENTS

GB          1439693 A       6/1976

OTHER PUBLICATIONS

Matsen, Marc R. et al., "Induction Heating Cells with Cauls over Mandrels Methods of Using Thereof", U.S. Appl. No. 15/841,918, filed Dec. 14, 2017, 35 pgs.
(Continued)

*Primary Examiner* — Charles Cheyney
(74) *Attorney, Agent, or Firm* — Kwan & Olynick LLP (57) ABSTRACT

Disclosed are induction heating cells comprising tensioning members with non-magnetic metal cores. Also disclosed are methods of operating such cells, for example, to process composite parts. The non-magnetic metal cores of the tensioning members provide excellent tensile strength. Furthermore, the non-magnetic metal cores allow forming long tensioning members leading to large induction heating cells for processing large composite parts, such aircraft fuselage parts, wing parts, and the like. The diameter of these non-magnetic metal cores is less than the induction heating threshold for magnetic fields used during operation of the cells, which ensures limited or no interaction of the cores with the magnetic fields. The cores can be arranged into a tensioning member extending through and compressing the die of an induction heating cell. When multiple cores are used, these cores are electrically insulated from each other, e.g., using an insulating shell or spacing these cores away from each other.

23 Claims, 7 Drawing Sheets

(51) Int. Cl.
*B29C 35/08* (2006.01)
*B29C 33/06* (2006.01)

(58) Field of Classification Search
CPC ..... H05B 6/101; B29C 66/71; B29C 66/8122; B29C 33/06; B29C 2035/0811
USPC .................................. 219/676, 633, 635, 647
See application file for complete search history.

(56) References Cited

U.S. PATENT DOCUMENTS

| | | | |
|---|---|---|---|
| 5,277,045 A * | 1/1994 | Mahoney | B21D 26/055 72/60 |
| 5,558,015 A * | 9/1996 | Miyashita | B29C 43/203 100/211 |
| 5,599,472 A * | 2/1997 | Brown | B21D 26/021 219/634 |
| 5,683,608 A | 11/1997 | Matsen et al. | |
| 6,211,498 B1 * | 4/2001 | Patridge | H05B 6/02 219/660 |
| 6,365,884 B1 * | 4/2002 | Hanton | H05B 6/104 219/672 |
| 6,897,419 B1 * | 5/2005 | Brown | H05B 6/105 219/634 |
| 6,979,807 B2 * | 12/2005 | Anderson | B29C 33/04 156/379.6 |
| 9,610,654 B1 | 4/2017 | Matsen et al. | |
| 2003/0106890 A1 | 6/2003 | Matsen et al. | |
| 2015/0013894 A1 | 1/2015 | Matsen et al. | |
| 2015/0137427 A1 | 5/2015 | Matsen et al. | |
| 2016/0354994 A1 | 12/2016 | Meure et al. | |

OTHER PUBLICATIONS

Matsen, Marc R. et al., "Induction Heating Cells with Controllable Thermal Expansion of Bladders and Methods of Using Thereof", U.S. Appl. No. 15/841,964, filed Dec. 14, 2017, 27 pgs.
"European Application Serial No. 18209262.7, Search Report dated Apr. 2, 2019", 7 pgs.

* cited by examiner

INDUCTION HEATING CELLS COMPRISING TENSIONING MEMBERS WITH NON-MAGNETIC METAL CORES

BACKGROUND

Processing large parts, especially, large parts having complex shapes can be very challenging. For example, applying pressure to consolidate and shape processed parts generates major forces in the tools used for processing. At the same time, many materials used for various tooling components may not be mechanically strong. Ceramics, for example, are often used for dies in induction heating cells because these materials do not interact with electromagnetic radiation. The electromagnetic radiation is used in the induction heating cells for heating only specific components and/or processed part. As such, the electromagnetic radiation must pass through other components thereby allowing local heating. Ceramic dies have to rely on reinforcement structures to compressively preload these dies and counteract tensile forces generated in induction heating cells during processing. Compressive preloading thereby maintains the mechanical integrity of the die. Like ceramics, these reinforcing structures should not interact with electromagnetic radiation or their interaction should be limited. This electromagnetic transparency requirement limits material options for the reinforcing structures.

SUMMARY

Disclosed are induction heating cells comprising tensioning members with non-magnetic metal cores. Also disclosed are methods of operating such cells, for example, to process composite parts. The non-magnetic metal cores of the tensioning members provide excellent tensile strength. Furthermore, the non-magnetic metal cores allow forming long tensioning members leading to large induction heating cells for processing large composite parts, such as aircraft fuselage parts, wing parts, and the like. The diameter of these non-magnetic metal cores is less than the induction heating threshold for magnetic fields used during operation of the cells, which ensures limited or no interaction of the cores with the magnetic fields. The cores can be arranged into a tensioning member extending through and compressing the die of an induction heating cell. When multiple cores are used, these cores are electrically insulated from other, e.g., using an insulating shell or spacing these cores away from each other.

Provided is an induction heating cell comprising a die, an induction heater, and a first tensioning member. The die comprises a first side and a second side. The die further comprises a forming surface, which extends at least in part between the first side and the second side. The forming surface is used to define the shape of a part processed in the induction heating cell. At least a portion of the induction heater, for example, a susceptor of the induction heater, is disposed adjacent to the forming surface of the die. The induction heater is configured to generate heat at or near the forming surface using a magnetic field. For example, an induction coil of the induction heater generates the magnetic field, while the susceptor interacts with the magnetic field and causes localized heating. The die and the first tensioning member are configured not to interact with the magnetic field, which allows to avoid heating of these components during operation of the induction heating cell.

The first tensioning member extends through the die between and past the first side and the second side of the die. The first tensioning member extends along a first direction. The first tensioning member comprises one or more strands. Each of the one or more strands comprises a non-magnetic metal core. In some examples, the non-magnetic metal core has a circular cross-section or a substantially circular cross-section, within the plane perpendicular to the first direction. The largest cross-sectional dimension of the non-magnetic metal core (e.g., a diameter of the circular cross-section) is less than the induction heating threshold for the magnetic field. This ensures that the first tensioning member does not interact with the magnetic field during operation of the induction heating cell.

For purposes of this disclosure, a non-magnetic metal core is defined as a core made from a metal or a metal alloy, which are non-magnetic and have minimal or no reaction to magnetic fields, used during operation of the induction heating cell. For example, the metal or a metal alloy of the non-magnetic metal core may have dipole moments of atoms being oriented in different directions and internally balanced. For comparison, magnetic materials have dipole moments coordinated such that these dipole moments point generally in the same direction, which results in strong reaction to a magnetic fields.

In some examples, the one or more strands of the first tensioning member comprise multiple strands. Each of the multiple strands is electrically insulated from any other one of the multiple strands. This feature allows for a bundle of the multiple strands to avoid reaction with a magnetic field during operation of the induction heating cell since the diameter of each strand is below the induction heating threshold for the magnetic field and there is no cumulative effect from the multiple strands.

In some examples, the multiple strands physically contact each other. In these examples, each of the multiple strands comprises an insulating shell, disposed around the non-magnetic metal core. These shells allow the multiple strands to physically contact each other, while their non-magnetic metal cores remain electrically insulated from each other. In some examples, the insulating shell comprises one of polyimide, polypropylene, or metal oxide.

In some examples, the multiple strands are twisted together. Without being restricted to any particular theory, it is believed that twisting the multiple strands together enhances the overall mechanical strength of the bundle formed by these multiple strands.

In some examples, the multiple strands are physically separated from each other. The separation provides electrical insulation of the multiple strands. In specific examples, these multiple strands do not have insulating shell and the physical separation is relied on to maintain electrical insulation of the non-magnetic metal cores.

In some examples, the non-magnetic metal core directly interfaces the die. In other words, the non-magnetic metal core does not have a shell, and the first tensioning member does not have a member casing. Alternatively, the induction heating cell further comprises a member casing, positioned around the first tensioning member and separating the first tensioning member from the die. The member casing allows removal and/or replacement of the one or more strands in the first tensioning member. The member casing is used in addition to insulating shells since the multiple strands are positioned in closed proximity inside the member casing.

In some examples, the largest cross-sectional dimension of the non-magnetic metal core of each of the one or more strands is less than 1.5 millimeters. The non-magnetic metal core comprises one of a stainless-steel alloy, aluminum, or titanium, in some examples. The non-magnetic metal core may have a resistivity of at least about $2.6 \times 10^{-8}$ Ohm-meter. In some examples, the first tensioning member exerts a compressive force onto the die between the first side and the second side.

In some examples, the induction heating cell further comprises a second tensioning member extending through the die and, for example, parallel to the plane, in some examples. In these examples, the projection of the first tensioning member onto the forming surface of the die and the projection of the second tensioning member onto the forming surface of the die are substantially perpendicular.

In some examples, the first tensioning member is a part of a first group, which includes other tensioning members. All tensioning members of the first group are parallel to each other. The first tensioning members of the first group are distributed throughout the die in accordance with the profile of the forming surface, in some examples.

In some examples, the dimension of the die along the first direction and between the first side and the second side is at least 5 meters. This size allows processing various large parts, for example, aircraft parts. The die may be formed from a ceramic material.

Also provided is a method of operating an induction heating cell. The method comprises a step of applying heat to a part disposed inside the induction heating cell. The induction heating cell comprises a die, an induction heater, and a first tensioning member. The heat is applied by the induction heater using a magnetic field. For example, the induction heater comprises an induction coil, which generates the magnetic field, and a susceptor, which locally converts the electromagnetic energy of the magnetic field into heat.

The method also comprises a step of applying pressure to the part disposed over a forming surface of the die. The first tensioning member extends through the die and applies a compressive force to the die while applying the pressure to the part. The first tensioning member comprises one or more strands. Each of the one or more strands comprises a non-magnetic metal core. In some examples, the non-magnetic metal core has a circular cross-section within a plane perpendicular to the first direction. The largest cross-sectional dimension of the non-magnetic metal core, e.g., a diameter of the circular cross-section, is less than an induction heating threshold for the magnetic field.

In some examples, the method further comprises controlling the compressive force applied to the die by the first tensioning member. The method may comprise a step of installing or replacing the first tensioning member.

DETAILED DESCRIPTION

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific examples, it will be understood that these examples are not intended to be limiting.
Introduction Composite materials, such as fiber-reinforced resins, are becoming increasingly popular for various applications, such as aircraft, automotive, and the like. These materials have a high strength-to-weight or high stiffness-to-weight ratio, and desirable fatigue characteristics. During fabrication, prepregs comprising continuous, woven, and/or chopped fibers embedded into an uncured matrix material (e.g., an organic resin) are stacked, and this stack is placed into an induction heating cell for curing, which involves heating and application of pressure. Such an induction heating cell may be also used for superplastic forming of titanium parts and/or other metal parts. One having ordinary skill in the art would understand that various other applications of induction heating cells are also within the scope of this disclosure. For simplicity, the reference will be made to a processed part and examples are directed to composite materials.

The induction heating cell comprises a forming surface, which (at least in part) defines the final shape of a processed part. In some examples, the forming surface defines this final shape by either directly interfacing the processed part or supporting another component of the cell (e.g., a susceptor of the induction heater which conforms to the forming surface) during processing. The induction heating cell is used to apply pressure and/or heat to the processed part. When the processed part is a composite, this application of the pressure and/or results in the matrix material flowing, changing shape, eliminating voids, and curing.

In some examples, the induction heating cell includes two or more dies. One of the dies comprises the forming surface for receiving parts processed using the cell. The induction heating cell also includes the induction heater, which, in some examples, is at least partially integrated into the die (e.g., coils of the induction heater extending through the die). In some examples, the induction heater includes one or more induction coils configured to generate a magnetic field. The magnetic field is used for localized heating of the processed part, directly and/or through a susceptor of the induction heater. The susceptor is used, for example, when the processed part is not able to sufficiently interact with the magnetic field and be heated directly by the magnetic field. When the susceptor is used, the susceptor is thermally coupled to the processed part. The reaction of other components of the induction heating cell with the magnetic field should be minimized.

During operation of the induction heating cell, the induction coil generates an oscillating electromagnetic field, which can pass though the dies without significant interference. The material of the die is specifically selected to allow this unobstructed passage of the electromagnetic radiation. In some examples, the die is made from a ceramic material or a composite material. The processed part and/or the susceptor of the cell absorbs the electromagnetic energy of the field and converts this energy into the local heat. As such, the processed part can be locally heated without heating most of the induction heating cell. This local heating reduces the overall thermal mass, allows quick heating up and cooling down cycles, and reduces thermal stresses to various components of the cell. Not only the processing throughput and efficiencies are substantially increased, in comparison to convection or other types of heating, but this approach also results in substantial energy savings and preservation of the equipment.

During processing, the dies can be subjected to various loads. These loads may be generated, for example, due to pressing the dies against each other and against the processed part and/or due to heating and changing the shape of the processed part. As noted above, the material of the dies, such as ceramic or composite materials, are not susceptible to inductive heating. In some examples, these materials have small coefficients of thermal expansion and heat transfer. Furthermore, these materials have high compression strength but very low tensile strength and can easily crack when tensile stresses are applied. To address this tensile strength limitation, the dies are reinforced with tensioning members to apply compressive forces to the ceramic dies. These compressive forces counter tensile loads experienced by the cell during its operation thereby preserving integrity of the die. In other words, the induction heating cell is compressively preloaded using one or more tensioning members.

Conventionally, tensioning members are made from fiberglass. However, the tensile strength of the fiberglass is limited, e.g., 100-300 MPa. For comparison, the tensile strength of stainless steel is about 500 MPa, while the tensile strength of titanium-aluminum alloys can easily exceed 1,000 MPa and even reach 1,500 MPa. Furthermore, structural fiberglass rods are typically short (e.g., less than 6 meters) and cannot be used for large induction heating cells. Increasing the length of fiberglass rods is difficult and usually results in a major drop of its mechanical properties due to a higher probability of defects in the longer rods. On the other hand, tensioning members formed from metals and metal alloys do not experience such problems. However, many metals and metal alloys are susceptible to magnetic fields used in induction heating cells for localized heating. Therefore, fiberglass rods have been predominantly used in induction heating cells.

It has been found that a certain class of metals and metal alloys can be used for tensioning members without substantial interactions with a magnetic field and without generation of any noticeable heat, if such tensioning members has a particular geometric configuration. First, the metals and metal alloys in this class are non-magnetic, as defined above. For simplicity, such metals and metal alloys are collectively referred to as non-magnetic metals. Second, metal cores formed from these non-magnetic metals have dimensions that result in no appreciable interaction with the magnetic field and no heat generation due to the metal cores being present in the magnetic field. It is known that AC currents exhibit a skin depth. For alternating current, the current density decreases exponentially from the surface towards the inside. The skin depth, δ, is defined as the depth where the current density is just 1/e (about 37%) of the value at the surface; it depends on the frequency of the current and the electrical and magnetic properties of the conductor. If a component (or tensioning member in this case) has a cross-sectional thickness (or diameter) less that the skin depth, then the induced currents on the top and bottom interfere and cancel each other out thereby producing no resistance or joule heating. The induced current depth is governed by the equation below which indicates that the skin depth is an inverse function of induction heating frequency (higher frequency has a corresponding smaller skin depth).

$$\delta = \sqrt{\frac{\rho}{\pi \cdot \mu \cdot f}}$$

In this equation, ρ—represents the resistivity of a non-magnetic metal forming the tensioning member, μ—represents the magnetic permeability of this metal, f—represents the frequency for the magnetic field. In some examples, the resistivity of the non-magnetic metals forming the metal core of the tensioning member is at least about $2.6 \times 10^{-8}$ Ohm-meter. The frequency of the magnetic field used in the induction heating cell is between 0.1 kHz and 50 kHz, such as less than 10 kHz, in some examples. For example, a 300-series stainless steel wire having a diameter of less 1.5 millimeter will not heat appreciably in fields 10 KHz or below. This lack of heating is due to the current penetrating deeper in the non-magnetic material (with a permeability of ~1) that there is significant current cancellation in the wire and effectively no induced current flows.

Induction Heating Cell Examples

Figure 1:
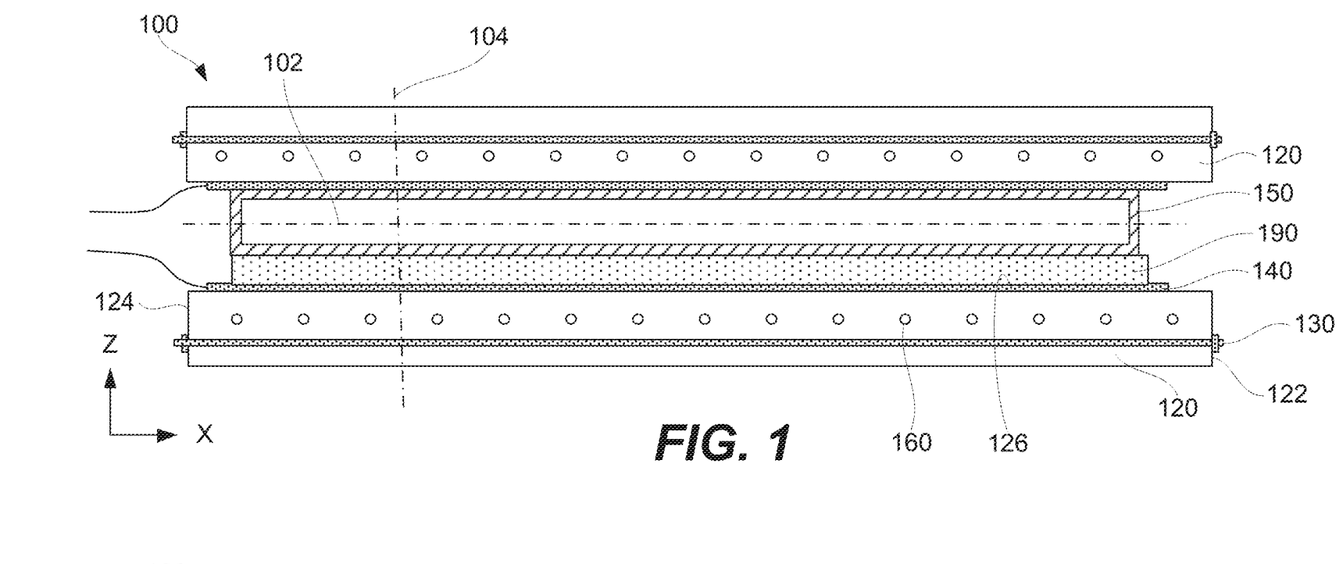
FIG. 1 illustrates a cross-sectional view of an induction heating cell, in accordance with some examples.

FIG. 1 illustrates a cross-sectional view of induction heating cell 100, in accordance with some examples. Induction heating cell 100 comprising die 120, induction heater 140, and first tensioning member 130. In some examples, induction heating cell 100 also comprises one or more additional dies 120 and/or bladder 150. Bladder 150 may be used for delivering uniform pressure to part 190. During processing, part 190 is positioned between two dies 120 or, more specifically, between bladder 150 and die 120. Various other examples of induction heating cell 100 are also within the scope. One having ordinary skill in the art would understand that tensioning member features of induction heating cell 100 described herein can be used in various types of induction heating cell 100 that would benefit from compressive preloading of their dies.

Die 120 is made from a material that is not susceptible to inductive heating. Some examples of such materials include, but are not limited to, a composite material or a ceramic material. The material of die 120 may have a low coefficient of thermal expansion, good thermal shock resistance, and relatively high compression strength. A specific example is a silica ceramic or, even more specific, castable fused silica ceramic.

Die 120 comprises first side 122 and second side 124. Furthermore, die 120 comprises forming surface 126, which extends at least in part between first side 122 and second side 124. In some examples, forming surface 126 comes in direct physical contact with processed part 190. Alternatively, induction heater 140 or, at least, a portion of induction heater 140 (e.g., a susceptor) is positioned between processed part 190 and forming surface 126. In some examples, forming surface 126 defines and is used to control the final shape of part 190 after its processing in induction heating cell 100. When the portion of induction heater 140 (e.g., a susceptor) is positioned between processed part 190 and forming surface 126, this portion may conform to forming surface 126.

Dies 120 is positioned between bolsters (not shown) used for supporting dies 120 and controlling position of dies 120. The bolsters provide rigid flat backing surfaces. In some examples, the bolsters are formed of steel, aluminum, or any other material capable of handling the loads present during panel forming. In specific examples, a non-magnetic material, such as aluminum or some steel alloys, is used for the bolsters to avoid any distortion to the magnetic field produced by induction heater 140.

Induction heater 140 is used to selectively heat processed part 190 without heating many other components of induction heating cell 100. This type of heating may be referred to as local heating or localized heating. In some examples, induction heater 140 comprises induction coils (e.g., solenoidal type induction coils) and, for example, one or more susceptor. In some examples, processed part 190 may be heated directly (e.g., operable as a susceptor) or a susceptor is permanently or temporarily integrated into processed part 190. For example, graphite or boron reinforced organic matrix composites (of processed part 190) are sufficiently susceptible to magnetic fields because of their reinforcing fibers. Processed part 190 made from these composites can be directly heated by induction. On the other hand, processed part 190, which comprises organic matrix composites, are sufficiently transparent to magnetic fields and receive the heat from a susceptor provided inside processed part 190 or adjacent to processed part 190. The susceptor heats inductively and then transfers at least some of its heat to processed part 190, which is thermally coupled to the susceptor. In some examples, the susceptor is formed from aluminum, an aluminum alloy, a ferromagnetic alloy (e.g., an alloy that has a Curie point above the processing temperature). The susceptor provides the intrinsic control based on the significant change in magnetic permeability. Specifically, the susceptor inductively heats at an accelerated rate below the Curie temperature due to its magnetic state. Then as the temperature nears its Curie point, the heat being generated in the susceptor falls by at least an order of magnitude. This creates the intrinsic thermal control via the susceptor as is typical of the heating mechanism when using the reinforced ceramic tools with the integrally cast induction coils.

Inductive heating is accomplished by providing an alternating electrical current to the induction coils of induction heater 140. This alternating current produces an alternating magnetic field in the vicinity of processed part 190 and any susceptors, if used. The heat is generated via eddy current heating. The frequency at which a coil driver drives the induction coils depends upon the nature of processed part 190. For example, the current penetration of copper at 3 kHz is approximately 1.5 millimeters, while the current penetration at 10 kHz is approximately 0.7 millimeters. The shape of the coil is used for controlling the magnetic field uniformity and, as a result, the heating/temperature uniformity.

In some examples, induction heater 140 or a portion thereof is disposed adjacent to forming surface 126 of die 120. Specifically, the portion of induction heater 140 (e.g., its susceptor) may directly interface forming surface 126. In some examples, forming surface 126 is a part of induction heater 140.

In some examples, the induction coils of induction heater 140 is integrated into die 120 and/or extends longitudinally through the length of die 120 adjacent to forming surface 126. The induction coils are connected to an external power source (e.g., a coil driver) and, in some examples, to a source of coolant. As such, in some examples, the induction coils are also used to remove some thermal energy by serving as a conduit for a coolant fluid, such as water.

First tensioning member 130 is used to apply and control compressive forces within die 120 and prevent die 120 from cracking during operation of induction heating cell 100. As shown in FIG. 1, first tensioning member 130 extends through die 120 between and past first side 122 and second side 124 along first direction 102. First direction 102 is referred to as a longitudinal direction or X-direction. When forming surface 126 is flat, first direction 102 is substantially parallel to forming surface 126.

Figure 5:
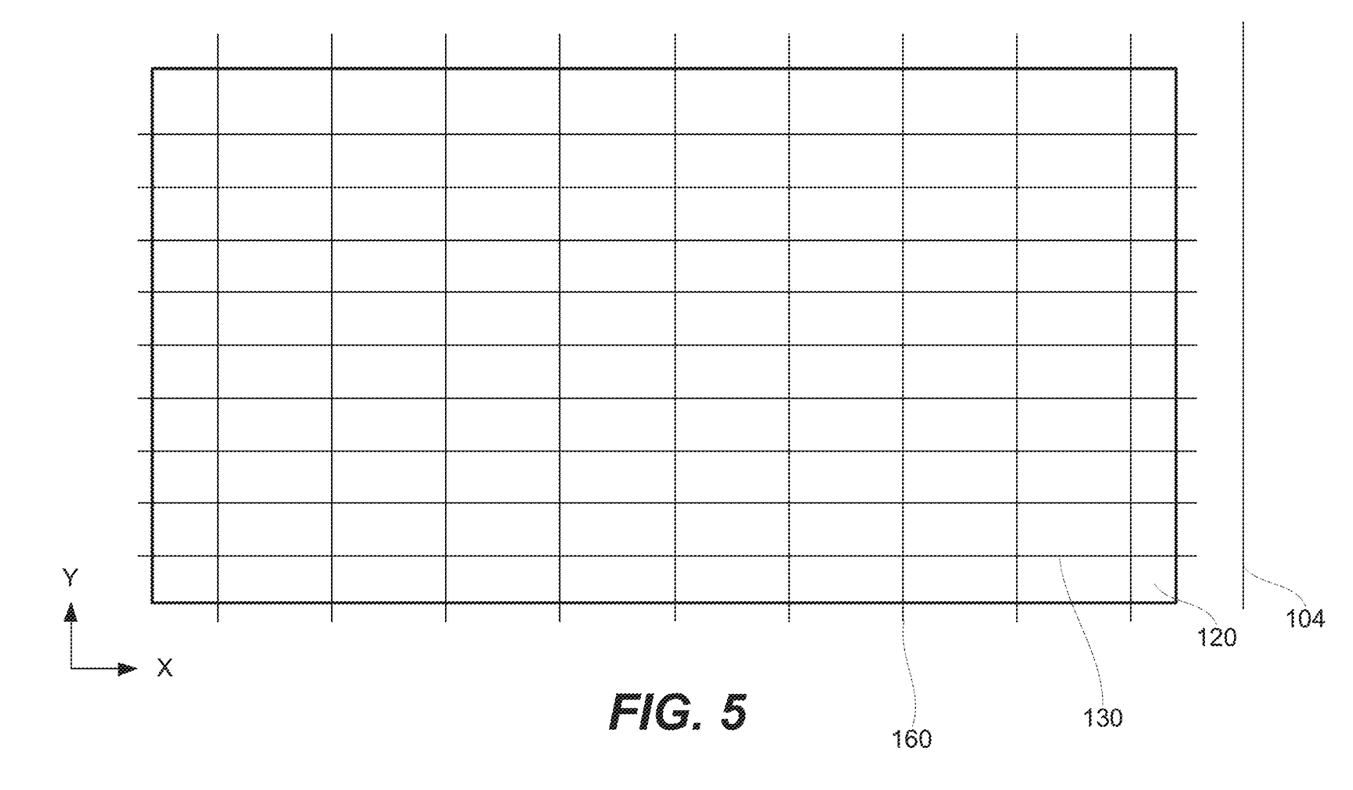
FIG. 5 illustrates an example of arranging two sets of tensioning members in a die, in accordance with some examples.

In some examples, induction heating cell 100 further comprises second tensioning member 160 extending through die 120 parallel to plane 104 as, for example, shown in FIG. 5. The direction, along which second tensioning member 160 extends, is referred to as a transverse direction or the Y-direction. The projection of first tensioning member 130 onto forming surface 126 of die 120 and projection of second tensioning member 160 onto forming surface 126 of die 120 are substantially perpendicular. The design of first tensioning member 130 is the same or different from the design of second tensioning member 160.

First tensioning member 130 comprises one strand 132 or multiple strands 132. Examples of first tensioning member 130 comprising multiple strands 132 are shown in FIGS. 2A-2C, 3C, and 3D. In specific examples, first tensioning member 130 comprises one strand 132. Such examples are used for smaller dies with small compressive forces needed in these dies since the diameter of each strand is limited by the induction heating threshold for the magnetic field.

Figure 2A:
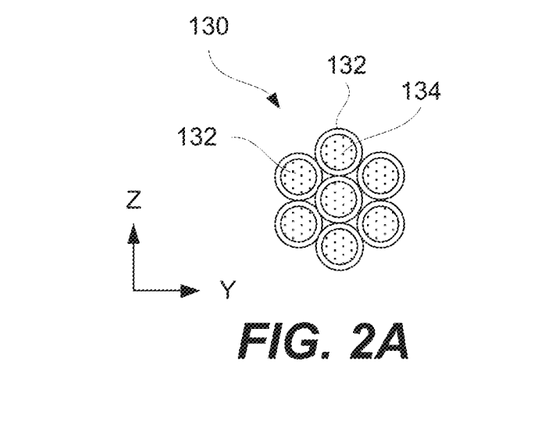
FIGS. 2A-2C illustrate cross-sectional views of a first tensioning member, which a part of the induction heating cell shown in FIG. 1, in accordance with some examples.
Figure 3A:
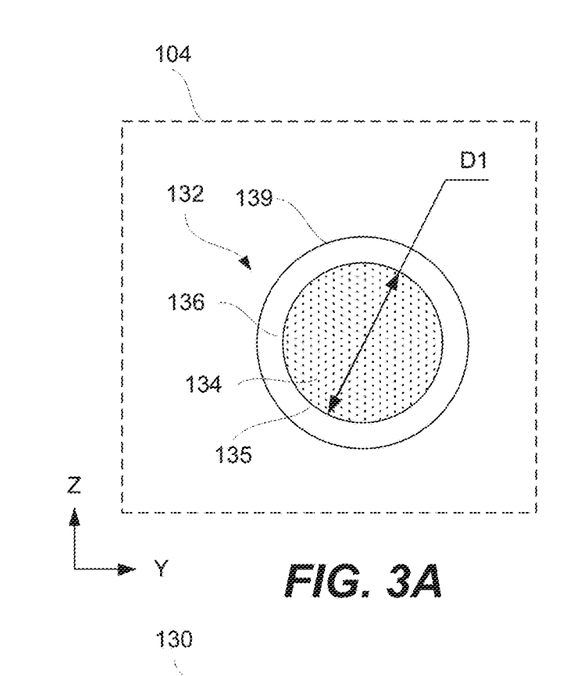
FIGS. 3A and 3B illustrate cross-sectional views of a strand of the first tensioning member, in accordance with some examples.
Figure 3B:
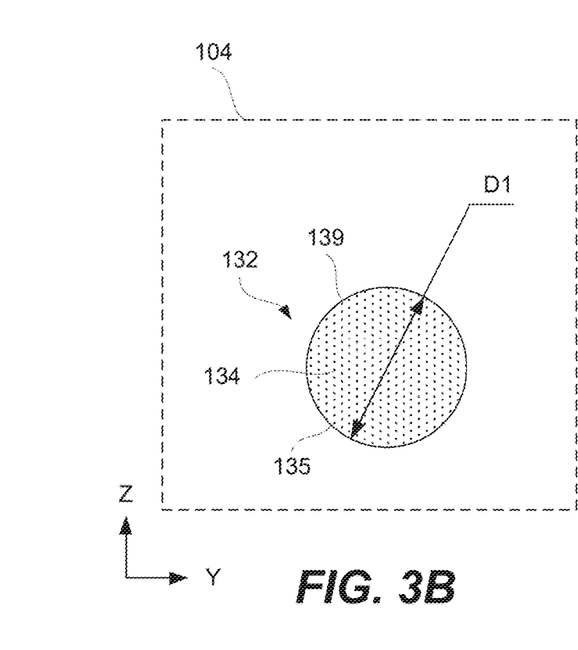

Regardless of the number of strands 132 in first tensioning member 130, each strand 132 comprises non-magnetic metal core 134 as, for example, shown in FIGS. 2A, 3A and 3B. Non-magnetic metal core 134 may have circular cross-section 135 within plane 104 perpendicular to first direction 102. However, other cross-sectional shapes are also within the scope as long as the largest cross-sectional dimension is below the skin depth as described above with reference to the inductive heating.

The largest cross-sectional dimension of cross-section 135 of non-magnetic metal core 134 (e.g., the diameter if cross-section 135 is circular) is less than the induction heating threshold for the magnetic field. This induction threshold depends on the frequency of the magnetic field and properties of the material. In some examples, the largest cross-sectional dimension (e.g., a diameter D1 in FIG. 3A) of cross-section 135 of non-magnetic metal core 134 is less than 1.5 millimeters or even less than 1.0 millimeter or even less than 0.7 millimeter, e.g., for a non-magnetic stainless steel. For materials with a higher resistivity (and, as a result larger skin depths), larger diameters can be used without causing heating.

In some examples, non-magnetic metal core 134 comprises one of a stainless-steel alloy, aluminum, or titanium. Non-magnetic metal core 134 may have a resistivity of at least about $2.6 \times 10^{-8}$ Ohm-meter or, more specifically, of at least about $5 \times 10^{-8}$ Ohm-meter or even less than about $10 \times 10^{-8}$ Ohm-meter. For example, resistivity of titanium is $43 \times 10^{-8}$ Ohm-meter, while resistivity of aluminum is $2.65 \times 10^{-8}$ Ohm-meter.

In some examples, first tensioning member 130 comprises multiple strands 132 as, for example, shown in FIGS. 2A-2C and 3A. Each of multiple strands 132 is electrically insulated from any other one of multiple strands 132. The electrical insulation of individual strands 132 in first tensioning member 130 ensures no interaction with the magnetic field during operation of induction heating cell 100. As such, if a current (e.g., a minimal current) is induced in one of multiple strands 132, this current is not carried to other strands, due to the electrical insulation, thereby minimizing the cumulative effect of dimension so as to effectively stay below the skin depth needed for current cancellation to avoid heating.

Figure 2B:
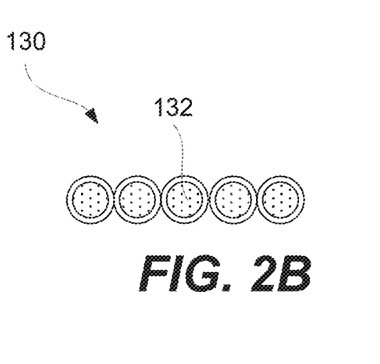

In specific examples, multiple strands 132 contact each other as, for example, shown in FIGS. 2A-2B and 3A. Even though multiple strands 132 physically contact each other, they remain electrically insulated. For example, each of multiple strands 132 comprises insulating shell 136, disposed around non-magnetic metal core 134 as, for example, shown in FIGS. 2A and 2B. Additional details are presented in FIG. 3A, which shows a cross-section of strand 132 within plane 104 perpendicular to first direction 102.

Insulating shell 136 allows multiple strands 132 to contact each other while remain electrically insulated from each other. In some examples, insulating shell 136 comprises one of polyimide, polypropylene, and metal oxide. The thickness of the insulating shell 136 may be between about 0.001 millimeters and 0.1 millimeters. When insulating shell 136 is present, external surface 139 of strand 132 is formed by insulating shell 136 as, for example, shown in FIG. 3A. Alternatively, when insulating shell 136 is not present, external surface 139 of strand 132 is formed by non-magnetic metal core 134 as, for example, shown in FIG. 3B. In these examples, non-magnetic metal core 134 directly interfaces die 120.

Figure 3C:
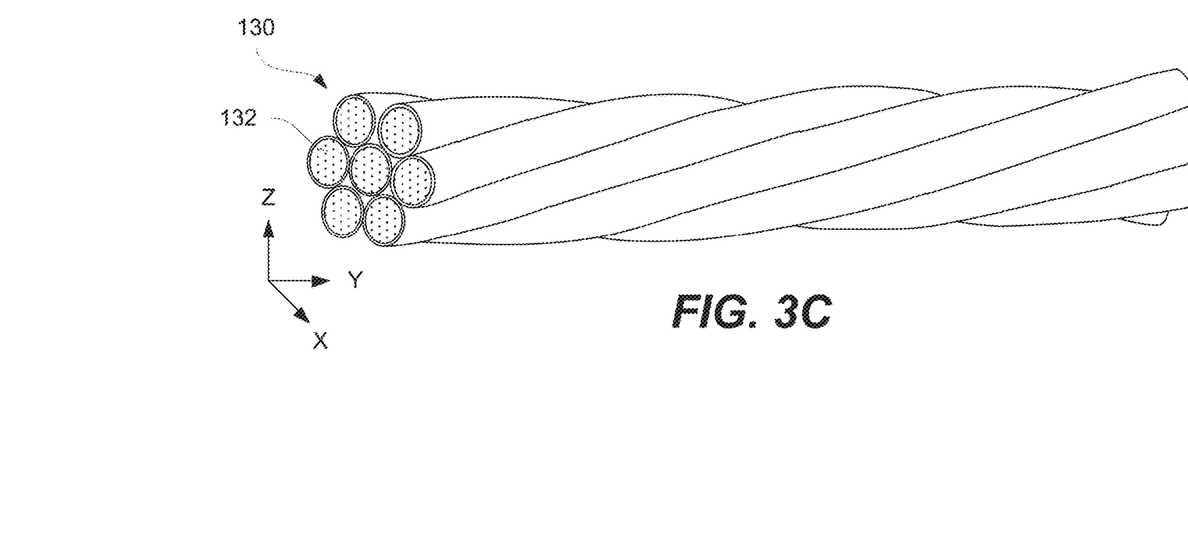
FIGS. 3C and 3D illustrate examples of arranging multiple strands in the first tensioning member, in accordance with some examples.
Figure 3D:
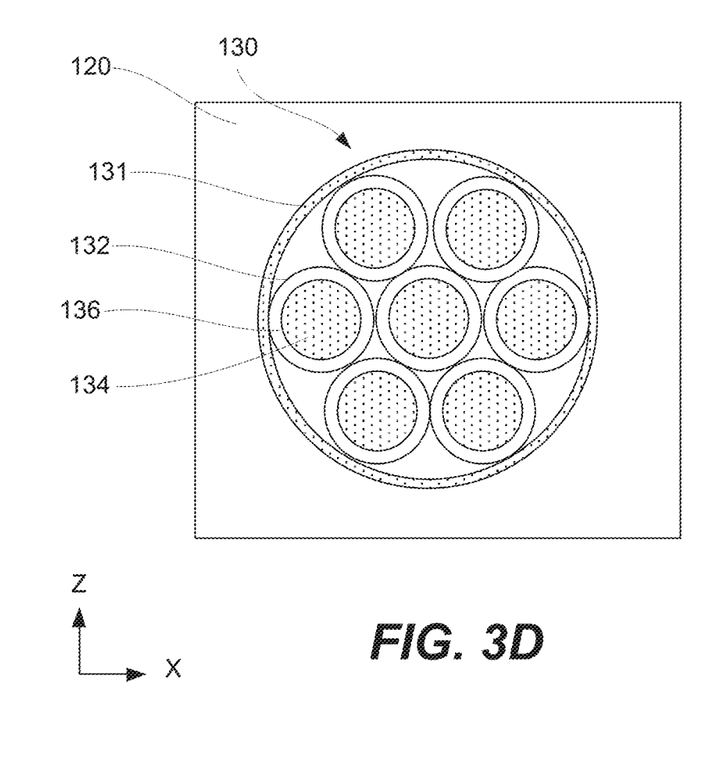

In some examples, multiple strands 132 are twisted together as, for example, shown in FIG. 3C. The twisting of strands 132 is believed to enhance the overall mechanical strength of first tensioning member 130 or, more specifically, of the bundle formed by multiple strands 132.

Figure 2C:
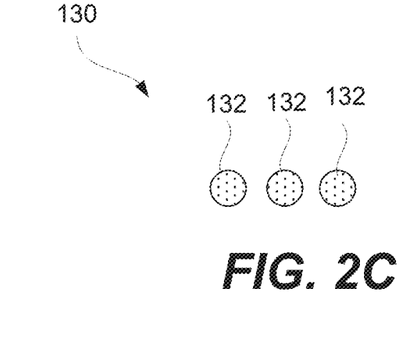

In some examples, multiple strands 132 are physically separated from each other as, for example, shown in FIG. 2C. This separation provides the electrical insulation of multiple strands 132 in first tensioning member 130 without a need for an insulating shell. When insulating shells are not present, strands 132 can be subjected to higher operating temperatures since the material of non-magnetic metal core 134 is generally more thermally stable than the material of insulating shells.

In some embodiments, different tension forces are applied to individual strands 132. Unlike multiple tensioning members disposed in same die 120, as further described below, multiple physically separated strands 132 of same tensioning member 130 are positioned within the close proximity, such as less than two diameters of strands 132.

In some examples, induction heating cell 100 comprises member casing 131, positioned around first tensioning member 130 and separating first tensioning member 130 from die 120. Unlike insulating shells 136 of individual strands 132, member casing 131 encloses all strands 132 of same tensioning member 130 as, for example, shown in FIG. 3D. In specific examples, member casing 131 is used in addition to insulating shell 136. Member casing 131 is used to protect non-magnetic metal core 134 and/or insulating shell 136 during installation of first tensioning member 130 and operation of induction heating cell 100. Furthermore, member casing 131 allows replacement of first tensioning member 130, in some examples.

In some examples, first tensioning member 130 exerts a compressive force onto die 120 between first side 122 and second side 124. Furthermore, the compressive force can be changed by adjusting first tensioning member 130 or, more specifically, the ends of first tensioning member 130 that are pressed against first side 122 and second side 124 of die 120. In some examples, one of the ends of first tensioning member 130 is threaded and threadably engages a nut pressed against first side 122 of die 120. The position of this nut on first tensioning member 130 can be changed in order to change the compressive force applied by first tensioning member 130 onto die 120.

In some examples, induction heating cell 100 further comprises second tensioning member 160 as, for example, schematically shown in FIG. 5. For example, second tensioning member 160 extends through die parallel to plane 104. More specifically, the projection of first tensioning member 130 onto forming surface 126 of die 120 and the projection of second tensioning member 160 onto forming surface 126 of die 120 is substantially perpendicular.

Figure 4:
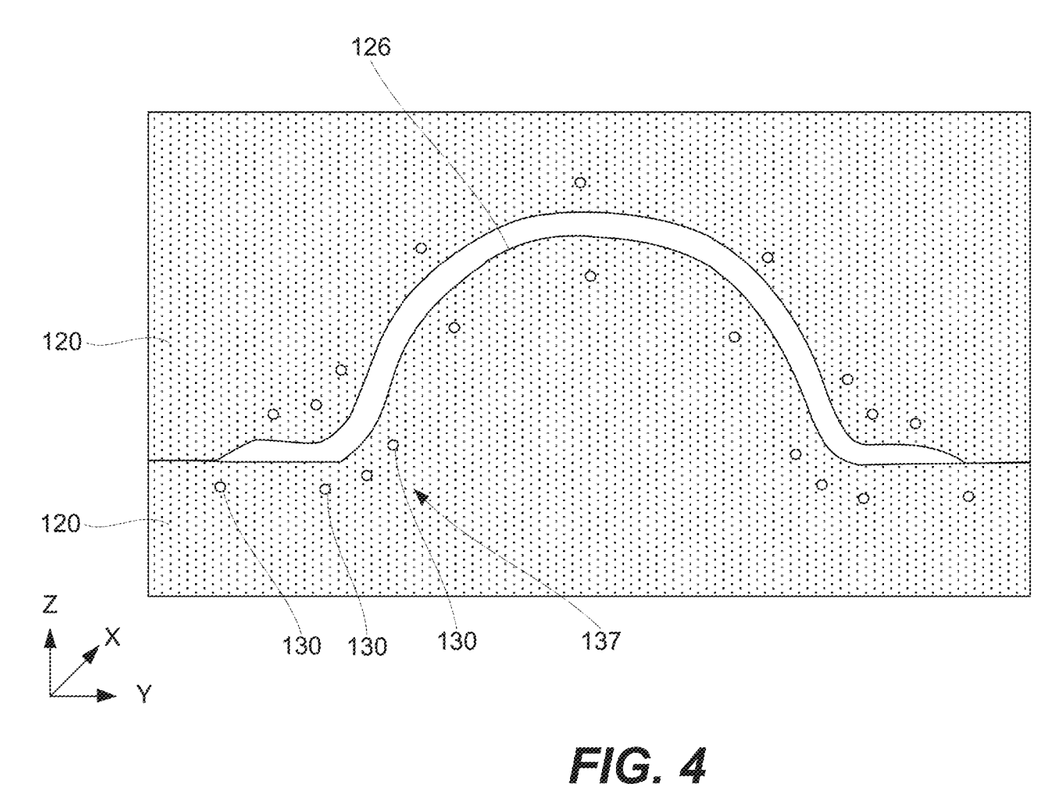
FIG. 4 illustrates an example of arranging multiple tensioning members in a die, in accordance with some examples.

In some examples, first tensioning member 130 is a part of first group 137 as, for example, schematically shown in FIG. 4. All tensioning members 130 of first group 137 are parallel to each other (e.g., extend in X direction). Furthermore, tensioning members 130 of first group 137 may be distributed throughout die in accordance with profile of forming surface 126.

In some examples, second tensioning member 160 has the same design as first tensioning member 130. Alternatively, the designs are different. Furthermore, the compression force applied to die 120 by first tensioning member 130 and the compression force applied to die 120 by second tensioning member 160 are the same or different. The compression forces depend on the profile of forming surface 126, in some examples.

In some examples, first tensioning member 130 is a part of a first group of tensioning members. All tensioning members of first group of tensioning members are parallel to each other. Tensioning members of first group of tensioning members may be distributed throughout die 120 in accordance with profile of forming surface. The dimension of die 120 along first direction and between first side and second side can be 5 meters or more. The die may be formed from a ceramic material.

Processing Examples

Figure 6:
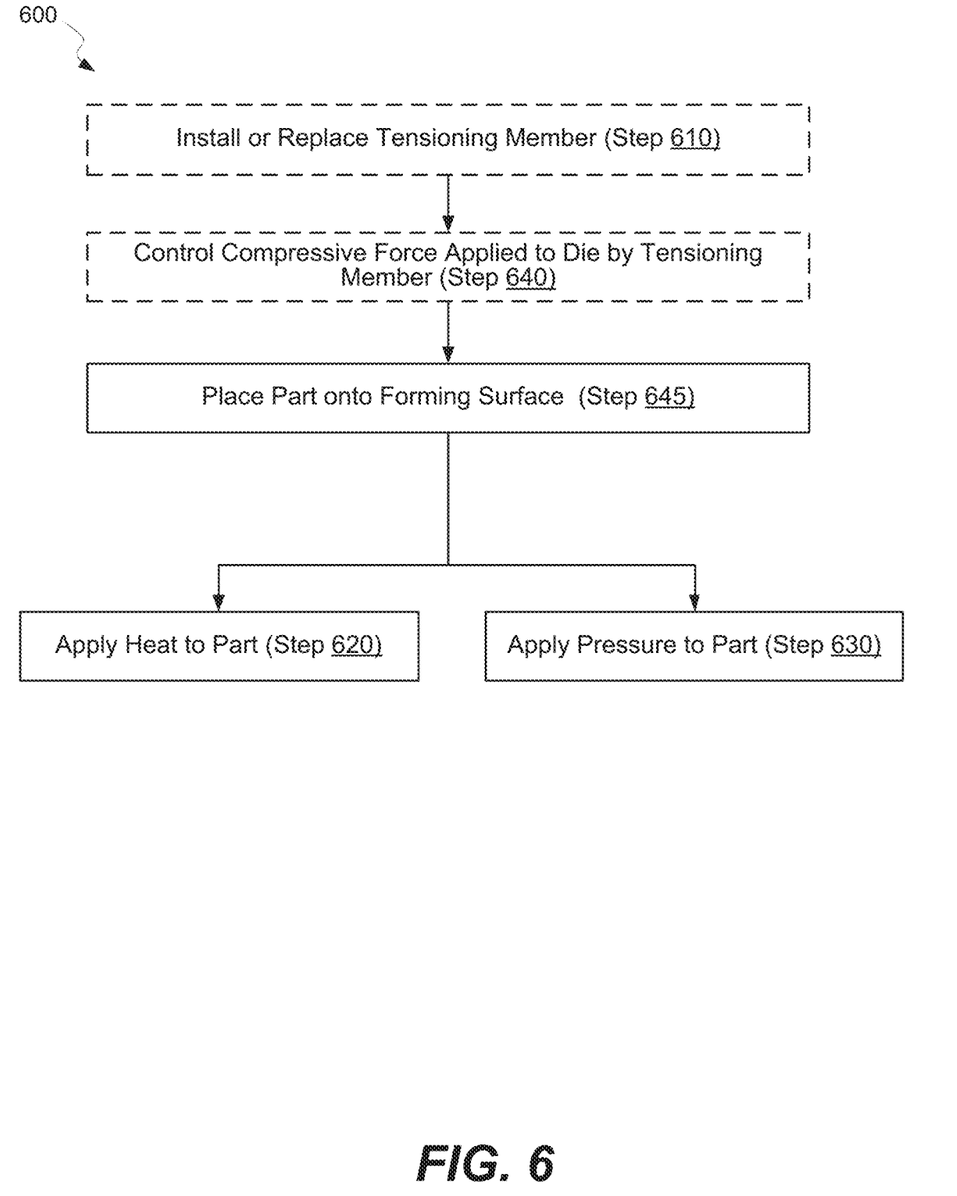
FIG. 6 is a process flowchart of a method of operating an induction heating cell, in accordance with some examples.

FIG. 6 is a process flowchart of method 600 of operating induction heating cell 100, in accordance with some examples. Various examples of induction heating cell 100 are described above.

In some examples, method 600 commences with optional step 610 of installing or replacing first tensioning member 130. First tensioning member 130 is installed or replaced in die 120. In some examples, induction heating cell 100 comprises member casing 131 with first tensioning member 130 positioned inside member casing 131. Member casing 131 physically separates first tensioning member 130 from die 120 and allows to install or replace first tensioning member 130.

In some examples, method 600 proceeds with optional step 640 of controlling the compressive force applied to die 120 by first tensioning member 130. As described above, first tensioning member 130 may include end features (e.g., threadable coupling) that can be adjusted during step 640.

Method 600 involves step 645 of placing part 190 onto forming surface 126. For examples, forming surface 126 is a part of a processing cavity formed by two dies. During this operation, one die may be moved away from the other die such that a sufficient space is available between the dies to place part 190 onto forming surface 126. Part 190 may be a composite layup for consolidation and/or cure, a metal part to be formed and/or heat treated. Some examples of part 190 that may be processed using this method and system include, but not limited to, thermoplastic composite or aluminum wing structures, air vehicle body panels (e.g., made via super-plastically formed titanium), thermoplastic composite fuselage sections, hot formed metallic engine nacelle components, and the like.

Method 600 comprises step 620 of applying heat to part 190 disposed inside induction heating cell 100. As described above, induction heating cell 100 comprises induction heater 140, which applies the heat during this step using a magnetic field. In some examples, heating may commence prior to applying pressure to part 190 during step 630, at the time of applying the pressure, or even after applying the pressure. For example, part 190 may be first heated to its processing temperature. Once part 190 reaches this temperature, the pressure is applied to part 190.

Heating part 190 can expedite the curing process and/or make part 190 more conformal when, for example, the processing pressure is later applied. In some examples, heating part 190 involves passing the electrical current through the induction coils of induction heater 140, e.g., an alternating current at a frequency of between about 1-50 kHz. Die 120 and first tensioning member 130 are permeable to electromagnetic waves of the inductive heating.

Method 600 also comprises step 630 of applying pressure to part 190. During this step, first tensioning member 130 extends through die 120 and applies compressive force to die 120. Various examples of first tensioning member 130 are described above.

In some examples, the processing cavity is connected to an external gas source for applying the pressure during step 630. The processing pressure may be between about 50 psi and 500 psi or, more specifically, between about 100 psi and 400 psi, such as at least about 100 psi or even at least about 150 psi or at least about 200 psi.

Aircraft Examples

While the systems, apparatus, and methods disclosed above have been described with reference to aircrafts and the aerospace industry, it will be appreciated that the examples disclosed herein may be applied to any other context as well, such as automotive, railroad, and other mechanical and vehicular contexts.

Figure 7:
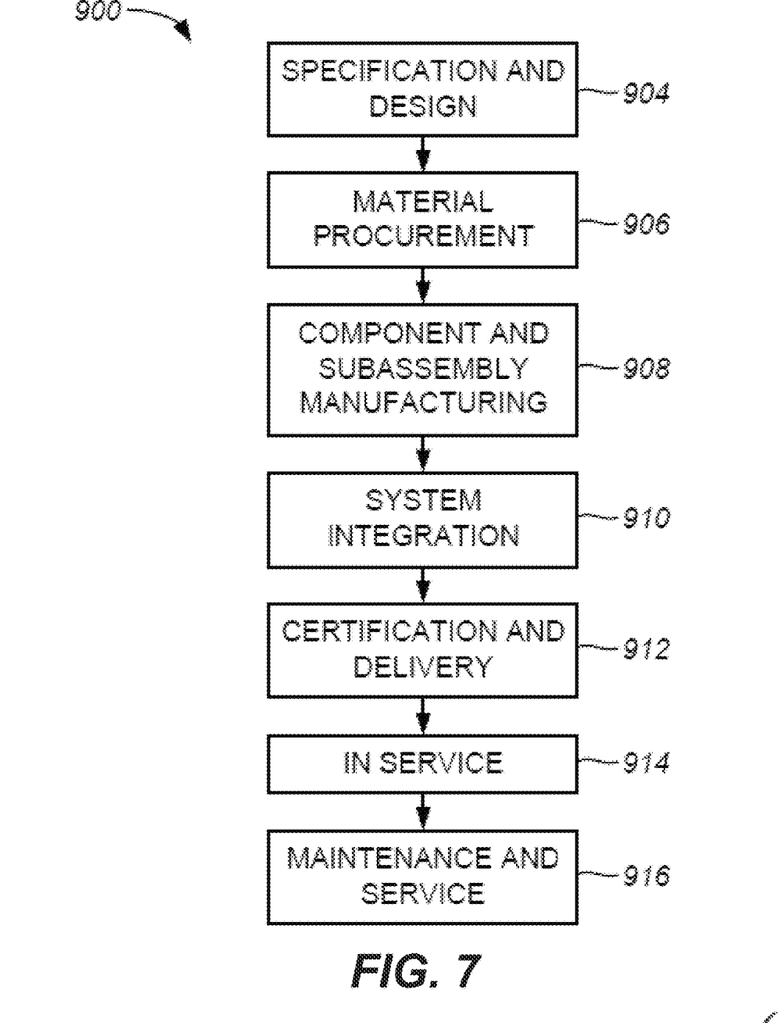
FIG. 7 illustrates a flow chart of an example of an aircraft production and service methodology, in accordance with some examples.
Figure 8:
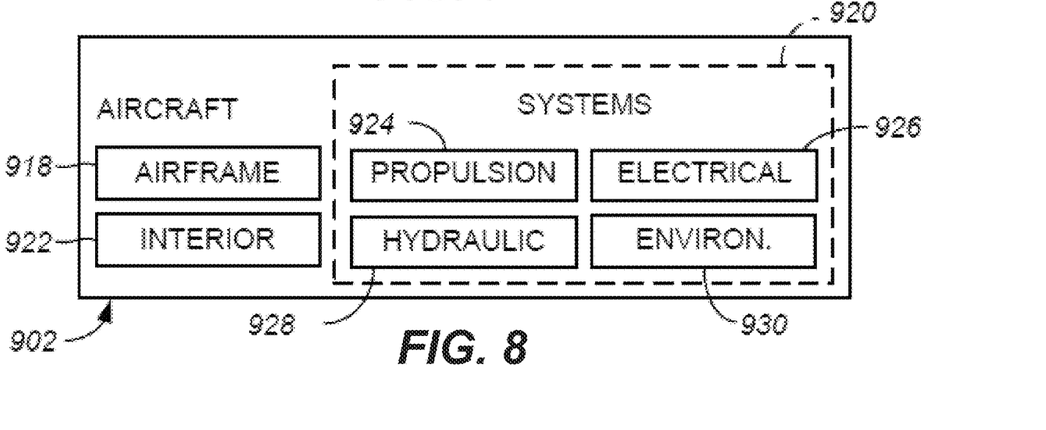
FIG. 8 illustrates a block diagram of an example of an aircraft, in accordance with some examples.

Accordingly, examples of the disclosure are described in the context of an aircraft manufacturing and service method 900 as shown in FIG. 7 and an aircraft 902 as shown in FIG. 8. During pre-production, illustrative method 900 includes specification and design 904 of aircraft 902 and material procurement 906. During production, component and subassembly manufacturing 908 and system integration 910 of aircraft 902 takes place. Thereafter, aircraft 902 goes through certification and delivery 912 in order to be placed in service 914. While in service by a customer, aircraft 902 is scheduled for routine maintenance and service 916 (which also includes modification, reconfiguration, refurbishment, and so on).

In some examples, each of the processes of method 900 is performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and sup-pliers; and an operator can be an airline, leasing company, military entity, service organization, and so on.

As shown in FIG. 8, aircraft 902 produced by illustrative method 900 includes airframe 918 with plurality of systems 920, and interior 922. Examples of high-level systems 920 include one or more of propulsion system 924, electrical system 926, hydraulic system 928, and environmental system 930. Any number of other systems can be included. Although an aerospace example is shown, the principles of the examples disclosed herein may be applied to other industries, such as the automotive industry.

Apparatus and methods embodied herein can be employed during any one or more of the stages of production and service method 900. For example, components or subassemblies corresponding to manufacturing 908 are fabricated or manufactured in a manner similar to components or subassemblies produced while aircraft 902 is in service. Also, one or more apparatus examples, method examples, or a combination thereof may be utilized during manufacturing 908 and system integration 910, for example, by substantially expediting assembly of or reducing the cost of an aircraft 902. Similarly, one or more of apparatus examples, method examples, or a combination thereof may be utilized while aircraft 902 is in service, for example and without limitation, to maintenance and service 916.

CONCLUSION

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatus. Accordingly, the present examples are to be considered as illustrative and not restrictive.

Illustrative, non-exclusive examples of inventive features according to present disclosure are described in following enumerated paragraphs:

A1. Induction heating cell 100 comprising:
  die 120, wherein:
  die 120 comprises first side 122 and second side 124; and
  die 120 further comprises forming surface 126;
  induction heater 140, wherein:
  at least portion of induction heater 140 is disposed adjacent to forming surface 126 of die 126; and
  induction heater 140 is configured to generate heat using a magnetic field; and
  first tensioning member 130, wherein:
  first tensioning member 130 extends through die 120 between and past first side 122 and second side 124 of die 120 and along first direction 102;
  first tensioning member 130 comprises one or more strands 132;
  each of one or more strands 132 comprises non-magnetic metal core 134; and
  the largest cross-sectional dimension of non-magnetic metal core 134 is less than the induction heating threshold for the magnetic field.

A2. Induction heating cell 100 according to paragraph A1, wherein:
  one or more strands 132 comprise multiple strands 132, each of multiple strands 132 is electrically insulated from any other one of multiple strands 132.

A3. Induction heating cell 100 according to paragraph A2, wherein multiple strands 132 contact each other.

A4. Induction heating cell 100 according to paragraphs A2-A3, wherein each of multiple strands 132 comprises insulating shell 136, disposed around non-magnetic metal core 134.

A5. Induction heating cell 100 according to paragraph A4, wherein insulating shell 136 comprises one of polyimide, polypropylene, or metal oxide.

A6. Induction heating cell 100 according to paragraphs A2-A5, wherein multiple strands 132 are twisted together.

A7. Induction heating cell 100 according to paragraphs A2-A5, wherein multiple strands 132 are physically separated from each other.

A8. Induction heating cell 100 according to paragraphs A1-A7, wherein non-magnetic metal core 134 directly interfaces die 120.

A9. Induction heating cell 100 according to paragraphs A1-A8, further comprising member casing 131, positioned around first tensioning member 130 and separating first tensioning member 130 from die 120.

A10. Induction heating cell 100 according to paragraphs A1-A9, wherein the largest cross-sectional dimension of non-magnetic metal core 134 of each of one or more strands 132 is less than 1.5 millimeters.

A11. Induction heating cell 100 according to paragraphs A1-A10, wherein non-magnetic metal core 134 comprises one of stainless-steel alloy, aluminum, or titanium.

A12. Induction heating cell 100 according to paragraphs A1-A11, wherein non-magnetic metal core 134 has a resistivity of at least about $2.6 \times 10^{-1}$ Ohm-meter.

A13. Induction heating cell 100 according to paragraphs A1-A12, wherein first tensioning member 130 exerts a compressive force on die 120 between first side 122 and second side 124.

A14. Induction heating cell 100 according to paragraphs A1-A13, further comprising second tensioning member 160 extending through die parallel to plane 104.

A15. Induction heating cell 100 according to paragraph A14, wherein projection of first tensioning member 130 onto forming surface 126 of die 120 and projection of second tensioning member 160 onto forming surface 126 of die 120 are substantially perpendicular.

A16. Induction heating cell 100 according to paragraphs A1-A14, wherein first tensioning member 130 is part of first group of tensioning members 137, and wherein first tensioning members 130 of first group of tensioning members 137 are parallel to each other.

A17. Induction heating cell 100 according to paragraph A16, wherein first tensioning members 130 of first group of tensioning members 137 are distributed throughout die 120 in accordance with the profile of forming surface 126.

A18. Induction heating cell 100 according to paragraphs A1-A17, wherein the dimension of die 120 along first direction 102 and between first side 122 and second side 124 is at least 5 meters.

A19. Induction heating cell 100 according to paragraph A1-A18, wherein die 120 is formed from a ceramic material.

A20. Induction heating cell 100 according to paragraphs A1-A19, further comprising end support 132 adjustably connected to first tensioning member 130 and pressing against first side 122 of die, wherein adjustable end support 132 is configured to control the compressive force applied by first tensioning member 130 on to die 120.

B1. Method 600 of operating an induction heating cell 100, method 600 comprising:
step 620 of applying heat to part 190 disposed inside induction heating cell 100, wherein:
induction heating cell 100 comprises die 120, induction heater 140, and first tensioning member 130; and
the heat is applied by induction heater 140 using a magnetic field; and
step 630 of applying pressure to part 190 disposed over forming surface 126 of die 120, wherein:
first tensioning member 130 extends through die 120 and applies a compressive force to die 120 while applying pressure to part 190;
first tensioning member 130 comprises one or more strands 132;
each of one or more strands 132 comprises non-magnetic metal core 134; and
the largest cross-sectional dimension of non-magnetic metal core 134 is less than the induction heating threshold for magnetic field.

B2. Method 600 according to paragraph B1, further comprising step 640 of controlling a compressive force applied to die 120 by first tensioning member 130.

B3. Method 600 according to paragraphs B1-B2, further comprising step 610 of replacing first tensioning member 130.

B4. Method 600 according to paragraphs B1-B3, wherein:
one or more strands 132 comprise multiple strands 132, each of multiple strands 132 is electrically insulated from any other one of multiple strands 132.

B5. Method 600 according to paragraph B4, wherein multiple strands 132 contact each other.

B6. Method 600 according to paragraphs B4-B5, wherein each of multiple strands 132 comprises insulating shell 136, disposed around non-magnetic metal core 134.

B7. Method 600 according to paragraph B6, wherein insulating shell 136 comprises one of polyimide, polypropylene, or metal oxide.

B8. Method 600 according to paragraphs B5-B7, wherein multiple strands 132 are twisted together.

B9. Method 600 according to paragraphs B5-B7, wherein multiple strands 132 are physically separated from each other.

B10. Method 600 according to paragraphs B1-B9, wherein non-magnetic metal core 134 directly interfaces die 120.

B11. Method 600 according to paragraphs B1-B10, wherein induction heating cell 100 further comprises member casing 131, positioned around first tensioning member 130 and separating first tensioning member 130 from die 120.

B12. Method 600 according to paragraphs B1-B11, wherein the largest cross-sectional dimension of non-magnetic metal core 134 of each of one or more strands 132 is less than 1.5 millimeters.

B13. Method 600 according to paragraphs B1-B12, wherein non-magnetic metal core 134 comprises one of stainless-steel alloy, aluminum, or titanium.

B14. Method 600 according to paragraphs B1-B13, wherein non-magnetic metal core 134 has a resistivity of at least about $2.6 \times 10^{-8}$ Ohm-meter.

B15. Method 600 according to paragraphs B1-B14, wherein first tensioning member 130 exerts a compressive force on die 120 between first side 122 and second side 124.

B16. Method 600 according to paragraphs B1-B15, wherein induction heating cell 100 further comprises second tensioning member 160 extending through die parallel to plane 104.

B17. Method 600 according to paragraph B16, wherein projection of first tensioning member 130 onto forming surface 126 of die 120 and projection of second tensioning member 160 onto forming surface 126 of die 120 are substantially perpendicular.

B18. Method 600 according to paragraphs B1-B17, wherein first tensioning member 130 is part of first group of tensioning members 137, and wherein first tensioning members 130 of first group of tensioning members 137 are parallel to each other.

B19. Method 600 according to paragraph B18, wherein first tensioning members 130 of first group of tensioning members 137 are distributed throughout die 120 in accordance with the profile of forming surface 126.

B20. Method 600 according to paragraphs B1-B20, wherein the dimension of die 120 along first direction 102 and between first side 122 and second side 124 is at least 5 meters.

B21. Method 600 according to paragraphs B1-B20, wherein die 120 is formed from a ceramic material.

B22. Method 600 according to paragraphs B1-B10, wherein induction heating cell 100 further comprises end support 132 adjustably connected to first tensioning member 130 and pressing against first side 122 of die, wherein adjustable end support 132 is configured to control the compressive force applied by first tensioning member 130 on to die 120.

What is claimed is:

1. An induction heating cell comprising:
   a die, for applying pressure to a part, wherein:
      the die comprises a first side and a second side,
      the die further comprises a forming surface;
   an induction heater, for applying heat to the part, wherein:
      at least a portion of the induction heater is disposed adjacent to the forming surface of the die,
      the induction heater is configured to generate heat using a magnetic field;
   a first tensioning member, wherein:
      the first tensioning member extends through the die between and past the first side and the second side of the die and along a first direction;
      the first tensioning member comprises multiple strands, contacting each other and electrically insulated from each other;
      each of the multiple strands comprises a non-magnetic metal core; and
      a largest cross-sectional dimension of the non-magnetic metal core is less than an induction heating threshold for the magnetic field.

2. The induction heating cell according to claim 1, wherein each of the multiple strands comprises an insulating shell, disposed around the non-magnetic metal core.

3. The induction heating cell according to claim 2, wherein the insulating shell comprises one of polyimide, polypropylene, or metal oxide.

4. The induction heating cell according to claim 1, wherein the multiple strands are twisted together.

5. The induction heating cell according to claim 1, further comprising a member casing, positioned around the first tensioning member and separating the first tensioning member from the die.

6. The induction heating cell according to claim 1, wherein the largest cross-sectional dimension of the non-magnetic metal core of each of the multiple strands is less than 1.5 millimeters.

7. The induction heating cell according to claim 1, wherein the non-magnetic metal core comprises one of a stainless-steel alloy, aluminum, or titanium.

8. The induction heating cell according to claim 1, wherein the non-magnetic metal core has a resistivity of at least about $2.6 \times 10^{-8}$ Ohm-meter.

9. The induction heating cell according to claim 1, wherein the first tensioning member exerts compressive force on the die between the first side and the second side.

10. The induction heating cell according to claim 1, further comprising a second tensioning member extending through the die.

11. The induction heating cell according to claim 10, wherein a projection of the first tensioning member onto the forming surface of the die and a projection of the second tensioning member onto the forming surface of the die are substantially perpendicular.

12. The induction heating cell according to claim 1, wherein the first tensioning member is a part of a first group of tensioning members, and wherein the first tensioning members of the first group of tensioning members are parallel to each other.

13. The induction heating cell according to claim 12, wherein the first tensioning members of the first group of tensioning members are distributed throughout the die in accordance with a profile of the forming surface.

14. The induction heating cell according to claim 1, wherein a dimension of the die along the first direction and between the first side and the second side is at least 5 meters.

15. The induction heating cell according to claim 1, wherein the die is formed from a ceramic material.

16. The induction heating cell according to claim 1, further comprising an end support, adjustably connected to the first tensioning member and pressing against the first side of the die, wherein the end support is configured to control a compressive force applied by the first tensioning member on to the die.

17. A method of operating an induction heating cell, the method comprising:
   a step of applying heat to a part disposed inside the induction heating cell, wherein:
      the induction heating cell comprises a die, an induction heater, and a first tensioning member,
      the die comprises a first side, a second side, and a forming surface,
      the heat is applied by the induction heater using a magnetic field, and
      at least a portion of the induction heater is disposed adjacent to the forming surface of the die; and
   a step of applying pressure to the part disposed over a forming surface of the die, wherein:
      the pressure is applied using the die;
      the first tensioning member extends through the die, between and past the first side and the second side of the die and along a first direction, and applies a compressive force to the die while applying the pressure to the part;
      the first tensioning member comprises multiple strands, contacting each other and electrically insulated from each other;
      each of the multiple strands comprises a non-magnetic metal core; and
      a largest cross-sectional dimension of the non-magnetic metal core is less than an induction heating threshold for the magnetic field.

18. The method according to claim 17, further comprising a step of controlling the compressive force applied to the die by the first tensioning member.

19. The method according to claim 17, further comprising a step of replacing the first tensioning member.

20. The induction heating cell according to claim 10, wherein:
- the second tensioning member comprises multiple second strands, contacting each other and electrically insulated from each other;
- each of the multiple second strands comprises a second non-magnetic metal core; and
- a largest cross-sectional dimension of the second non-magnetic metal core is less than the induction heating threshold for the magnetic field.

21. The induction heating cell according to claim 1, further comprising a bladder disposed between the first side and the second side of the die.

22. The induction heating cell according to claim 5, wherein the member casing encloses all of the multiple strands of the first tensioning member.

23. The induction heating cell according to claim 5, wherein the first tensioning member is slidable within the member casing allowing replacement of the first tensioning member in the induction heating cell.

* * * * *